United States Patent
Shinohara et al.

(10) Patent No.: US 6,571,556 B2
(45) Date of Patent: Jun. 3, 2003

(54) RESERVOIR OF HYDRAULIC MASTER CYLINDER FOR VEHICLES

(75) Inventors: Takayoshi Shinohara, Nagano (JP); Kazuhiro Kosugi, Nagano (JP)

(73) Assignee: Nissin Kogyo Co., Ltd., Nagano-Ken (JP)

(*) Notice: Subject to any disclaimer, the term of this patent is extended or adjusted under 35 U.S.C. 154(b) by 0 days.

(21) Appl. No.: 09/901,622

(22) Filed: Jul. 11, 2001

(65) Prior Publication Data

US 2002/0005041 A1 Jan. 17, 2002

(30) Foreign Application Priority Data

Jul. 13, 2000 (JP) .......................... 2000-212539

(51) Int. Cl.⁷ ............................... B60T 11/26
(52) U.S. Cl. ....................................... 60/585
(58) Field of Search ........................... 92/585

(56) References Cited

U.S. PATENT DOCUMENTS 4,355,512 A * 10/1982 Kubota et al. ................ 60/585
5,924,285 A * 7/1999 Chiba .......................... 60/585

FOREIGN PATENT DOCUMENTS

| JP | 63-202560 | 12/1988 |
| JP | 3-73257 | 7/1991 |

* cited by examiner

Primary Examiner—F. Daniel Lopez
(74) Attorney, Agent, or Firm—McGuireWoods LLP

(57) ABSTRACT

A fluid injection port 10 is formed in the upper portion of a reservoir 5 at the front side of a vehicle. A first union hole 13 and a second union hole 14 are formed in a bottom wall 6g, and a level detector 15 is provided in a fluid chamber 4. The fluid chamber 4 is divided by partition walls 6i and 6j into a first fluid chamber 4a, a second fluid chamber 4b and a third fluid chamber 4c. The fluid injection port 10 communicates with the first fluid chamber 4a, the first union hole 13 communicates with both the first and the second fluid chambers 4a and 4b, and the second union hole 14 and the level detector 15 are placed in the third fluid chamber 4c. The second fluid chamber 4b and the third fluid chamber 4c communicate with each other via an opening 19.

18 Claims, 5 Drawing Sheets

6,571,556 B2

RESERVOIR OF HYDRAULIC MASTER CYLINDER FOR VEHICLES

BACKGROUND OF THE INVENTION

1. Field of the Invention

The present invention relates to a reservoir for supplementing the working fluid supplied to a hydraulic master cylinder for the brakes or the clutch of a vehicle, and in particular, a reservoir used for a tandem hydraulic master cylinder for two systems, and having a level detector contained in a fluid chamber, for detecting a reduction in the fluid level of the reservoir.

2. Description of the Related Art

Reservoirs disclosed in JP-A-63-202560U and JP-A-3-73257U, for example, are well-known parts provided for the hydraulic master cylinder that hydraulically actuates the brakes or the clutches of vehicles.

These reservoirs are employed for a tandem hydraulic master cylinder provided for two hydraulic systems. In the bottom wall of each of these reservoirs, there are formed a first union hole and a second union hole, which communicate with cylinder holes of the hydraulic master cylinder. The reservoir, in this case, is an integrally formed on the upper portion of the hydraulic master cylinder. And, the reservoir is located in an engine compartment that is separated from a passenger compartment by a dash panel.

A level detector is provided in a fluid chamber, which stores a working fluid inside of the reservoir. Such detector, in many cases, is constituted by a combination of a lead switch positioned at the bottom of the fluid chamber, and a float which is floated at the fluid level above the lead switch. Then, as the level of the working fluid is lowered and the float descends and approaches the lead switch, contact points on the lead switch are closed and an alarm unit or a warning signal light is activated, to thereby notify a driver that the volume of the working fluid in the fluid chamber has been reduced to a predetermined fluid level.

Recently, however, the arrangement of components has been complicated in a layout of the inside of the engine compartment. Further, an instrument panel and a windshield in the passenger compartment project upward in the vicinity of the dash panel whereat the hydraulic master cylinder and the reservoir can be mounted. Therefore, the locations whereat the hydraulic master cylinder and the reservoir can be mounted, and the shapes thereof are greatly limited.

Therefore, the reservoir positioned on the upper portion of the hydraulic master cylinder has a flattened shaped with a lowly limited height. In order to compensate for the reduced volume due to this shape, the length of the reservoir has been extended in the longitudinal direction of the vehicle body and a fluid injection port is formed in its upper front portion, shifted from the location from which the dashboard and the windshield of the vehicle are projected. As a result, even upon only a small behavior of a vehicle, the working fluid in the fluid chamber is waved in the fluid level, or the fluid may surge forward or backward. Therefore, a float on the fluid level reacts sensitively, whereby the lead switch of a level detector is erroneously activated, or union holes may be exposed on the fluid level.

As a countermeasure, it has been proposed that the fluid chamber be divided into multiple small chambers. With this arrangement, however, the vehicle body front chamber where the fluid injection port is opened communicates with neither the first nor the second union hole, and the working fluid stored in this chamber is not used.

SUMMARY OF THE INVENTION

Taking the above drawback into account, the object of the present invention is to provide a reservoir for a hydraulic master cylinder for a vehicle in which, even though the reservoir is extended in the longitudinal direction of the vehicle body because of the limited height, the working fluid in a fluid chamber can be utilized, and erroneous operations of the level detector and the exposure of union holes can be prevented as much as possible.

To achieve the objective, according to the present invention, there is provided a reservoir for a tandem-type hydraulic master cylinder of a vehicle, including:

a fluid injection port disposed on an upper portion at the front side of the reservoir;

a bottom wall defining a first union hole and a second union hole adapted to be communicated with cylinder holes formed in the tandem-type hydraulic master cylinder;

a level detector arranged in a fluid chamber inside the reservoir, the level detector having a lead switch and a float; and first and second partition walls respectively extending along the widthwise direction of the reservoir within the fluid chamber so as to divide the fluid chamber into a first fluid chamber, a second fluid chamber and a third fluid chamber in this order from the front side of the reservoir, wherein the fluid injection port communicates with the first fluid chamber, and the first partition wall at the front side of the reservoir that divides into the first fluid chamber and the second fluid chamber is positioned to the upper surface of the first union hole so that the first union hole is communicated with the first fluid chamber and the second fluid chamber, wherein the second union hole and the level detector are arranged in one of either the second fluid chamber or the third fluid chamber, or an area extending over the second and the third fluid chambers; and wherein an opening is formed in an upper portion of the second partition wall at the rear side of the reservoir that divides into the second and the third fluid chambers, so that the second and the third fluid chambers communicate with each other.

Here, the wordings "the widthwise direction of the reservoir" mean a lateral direction of FIG. 2, and represent the substantially same direction as the widthwise direction of the vehicle in a state that the reservoir is arranged in the vehicle.

DETAILED DESCRIPTION OF THE PREFERRED EMBODIMENTS

Figure 1:
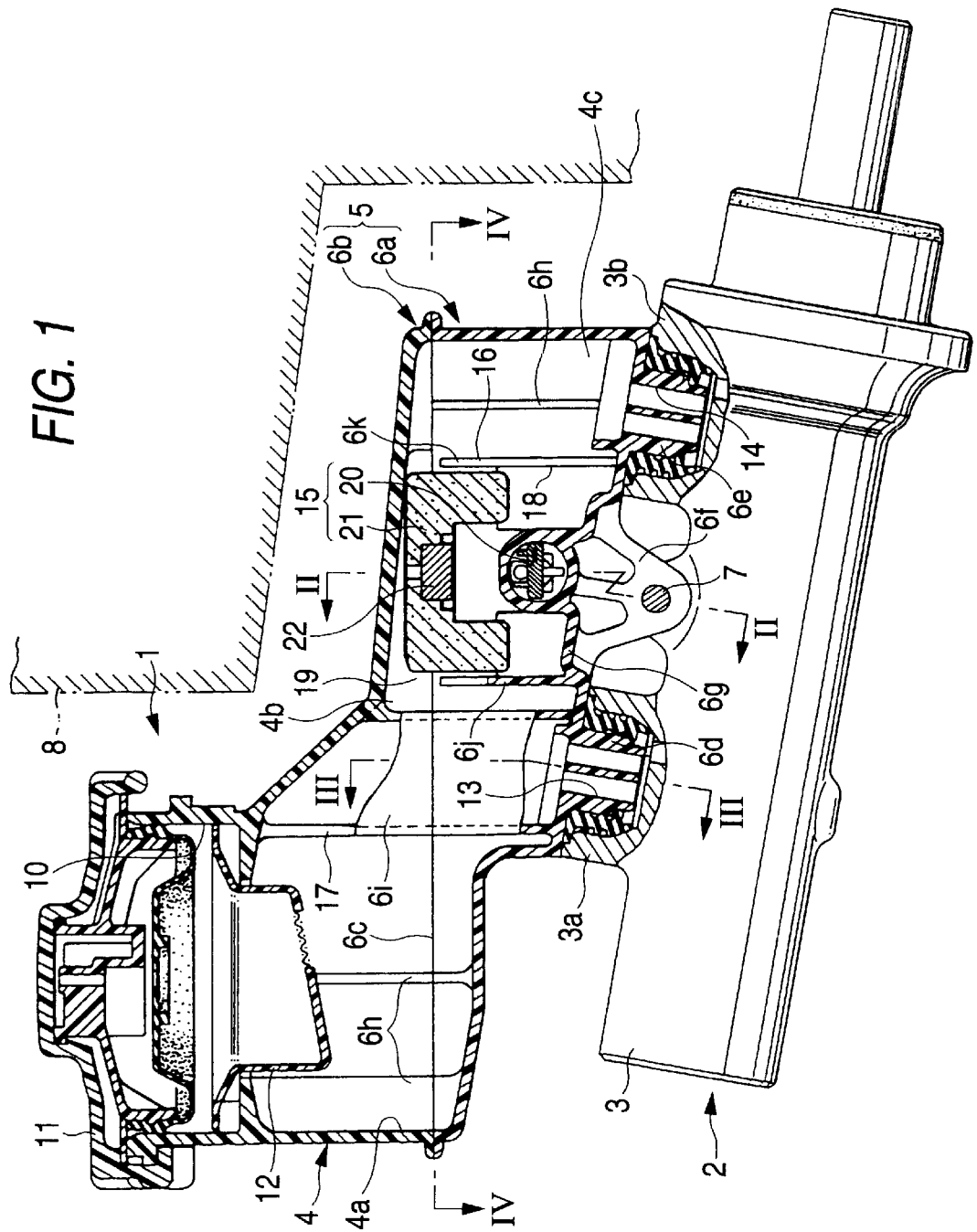
FIG. 1 is a partially cross-sectional front view of a hydraulic master cylinder according to a first embodiment of the present invention.

The embodiments of the present invention will now be described while referring to the accompanying drawings.

A first embodiment of the invention is shown in FIGS. 1 to 4. In the first embodiment shown in FIGS. 1 to 4, in an engine compartment 1 at the front of a vehicle body that is divided from a passenger compartment by a dashboard (neither shown), a hydraulic master cylinder 2 for a brake is positioned in the vicinity of the dash panel. The hydraulic master cylinder 2 is a tandem type for supplying to two brake systems, a working fluid pressurized inside a cylinder body 3. A reservoir 5 in which the working fluid is stored in a fluid chamber 4 is integrally attached to an upper portion of the cylinder body 3.

To form the reservoir 5, a lower half portion 6a and an upper half portion 6b, both composed of a rigid resin, are thermally fusion-bonded at a fusion surface 6c therebetween, and the space inside the reservoir 5 is defined as the fluid chamber 4. Bosses 6d and 6e are engaged with bosses 3a and 3b, and flanges 6f and 3c, which are overlapped between these bosses, are connected by a screw 7, so that the reservoir 5 is integrally coupled with the cylinder body 3 of the hydraulic master cylinder 2.

Since above the reservoir 5, an instrument panel 8 in the passenger compartment projects forward from the rear side of the reservoir 5 relative to the vehicle (hereinafter, "the rear side of the reservoir 5 relative to the vehicle" is referred to as "the rear side of the reservoir 5"), the reservoir 5 is designed to be comparatively flat with a limited height. On the other hand, at the front side of the reservoir 5 relative to the vehicle (hereinafter, "the front side of the reservoir 5 relative to the vehicle" is referred to as "the front side of the reservoir 5"), the reservoir 5 is raised and extends forward beyond the installment panel 8. Thus, since the reservoir 5 is designed to extend in the longitudinal direction of the vehicle, the volume of the fluid chamber 4, which is limited at the rear side of the reservoir 5, is compensated to the front side of the reservoir 5.

A fluid injection port 10 is formed in the upper portion at the front side of the reservoir 5, and a reservoir cap 11 and a strainer 12 are mounted on the fluid injection port 10. A first union hole 13 and a second union hole 14 are respectively formed in the bosses 6d and 6e, which project downward from the lower portion of a tilted bottom wall 6g at the rear side of the reservoir 5. The working fluid in the fluid chamber 4 is supplied through the first and second union holes 13 and 14 to the cylinder holes in the hydraulic master cylinder 2.

Multiple long and short ribs are vertically and horizontally formed in the lower half portion 6a and the upper half portion 6b, and abut at the fusion surface 6c when the half portions 6a and 6b are bonded together. The short ribs are used as ribs 6h for the reinforcement of the reservoir 5, and for preventing the waving of the working fluid.

The two long ribs that extend widthwise relative to the vehicle are used as partition walls 6i and 6j that divide the fluid chamber 4 into three chambers, a first fluid chamber 4a toward the front side of the vehicle, a second fluid chamber 4b in the center, and a third fluid chamber 4c toward the rear side of the vehicle. The fluid injection port 10 is located in the first fluid chamber 4a, the first union hole 13 is formed to extend over the first fluid chamber 4a and the second fluid chamber 4b, and the second union hole 14 and a level detector 15 are located in the third fluid chamber 4c.

The partition wall 6i positioned at the front side of the vehicle is bent to have a crank shape, and is extended in the longitudinal direction of the vehicle along the center axis of the first union hole 13. The first union hole 13 opens into both the first fluid chamber 4a and the second fluid chamber 4b. An opening 17 is formed in one upper side portion of the partition wall 6i. The first fluid chamber 4a and the second fluid chamber 4b communicate with each other through the opening 17 and the first union hole 13.

In the partition wall 6j of the rear side of the vehicle, a substantially C-shaped cylinder 6k in which a slit 16 is formed on the third fluid chamber side 4c, is located on the tilted bottom wall 6g, and has a height that is slightly less than that of the fusion surface 6c. The inside of the cylinder 6k is defined as a float chamber 18 for the level detector 15, and the float chamber 18 constitutes a part of the third chamber 4c. And in the upper portion of the cylinder 6k and in one side of the partition wall 6j toward the cylinder 6k, a continuous opening 19 is formed through which the second fluid chamber 4b and the third fluid chamber 4c communicate with each other.

A lead switch 20 is embedded in the tilted bottom wall 6g substantially along the partition wall 6j, and the lead switch 20 and a disk-shaped float 21, which is located inside the float chamber 18, constitute the level detector 15. When a magnet 22 embedded in the float 21 approaches the lead switch 20 to a predetermined distance, the magnet 22 excites and closes the contact points of the lead switch 20.

Figure 2:
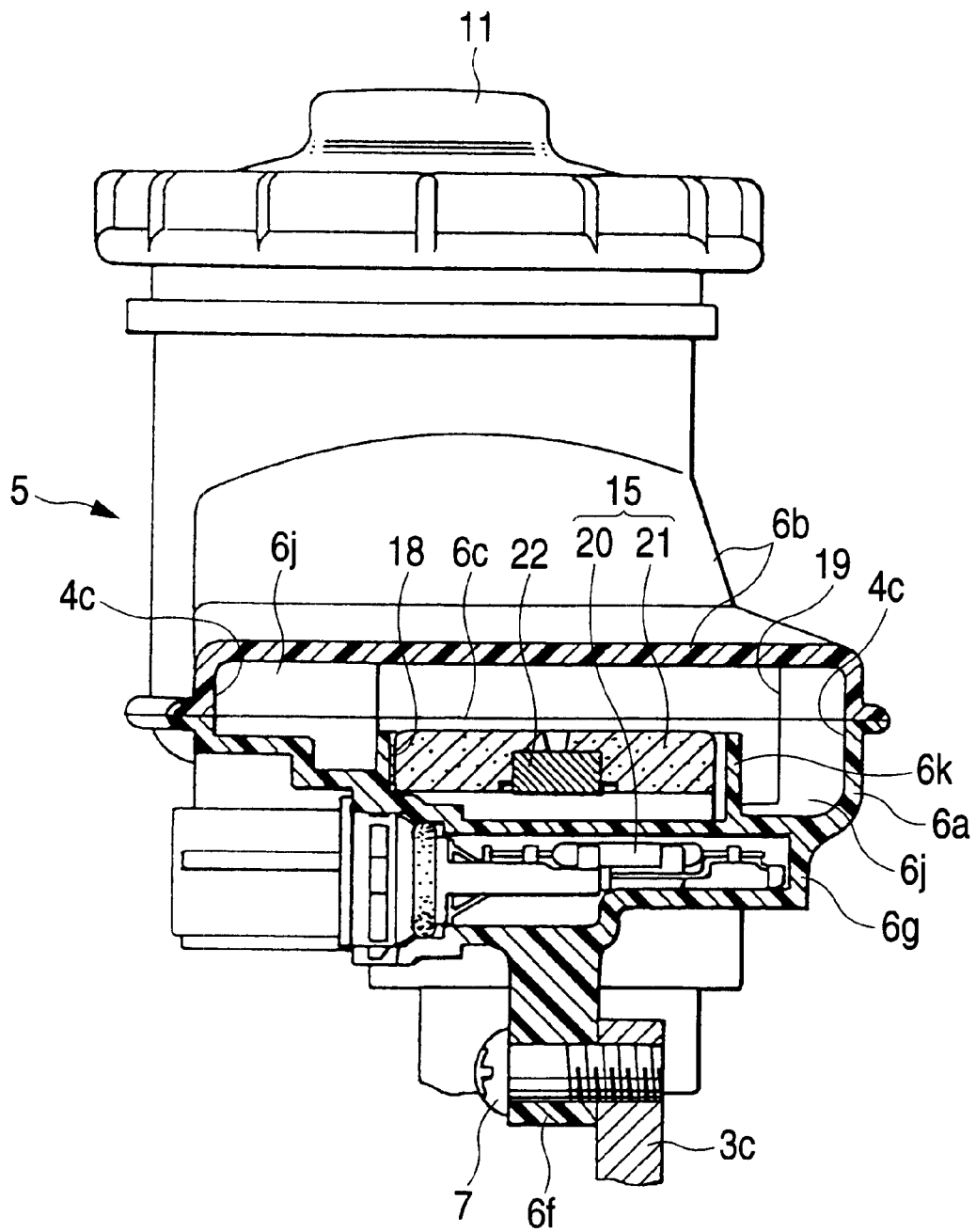
FIG. 2 is a cross-sectional view taken along line II–II in FIG. 1 according to the first embodiment of the invention.
Figure 3:
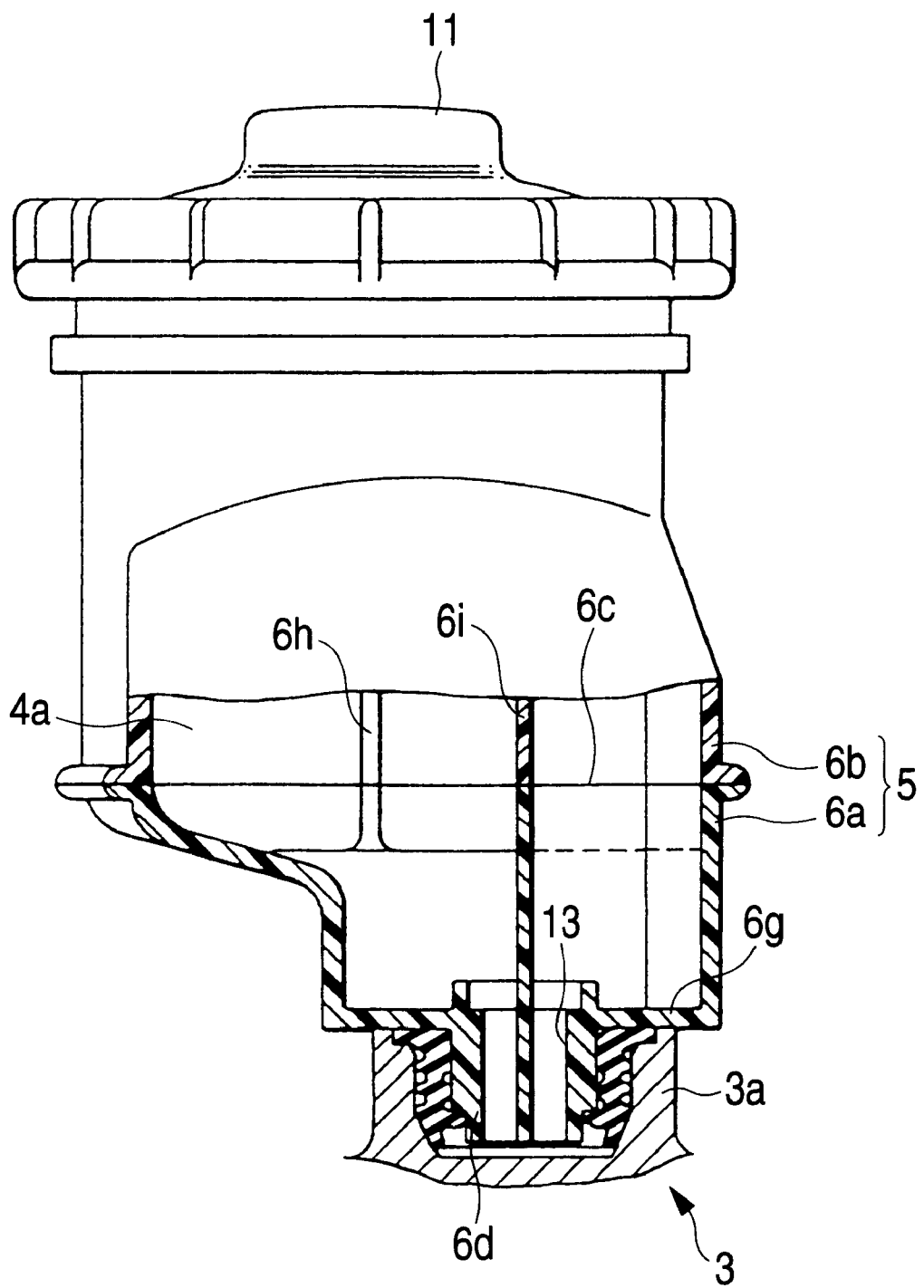
FIG. 3 is a cross-sectional view taken along line III—III in FIG. 1 according to the first embodiment of the invention.
Figure 4:
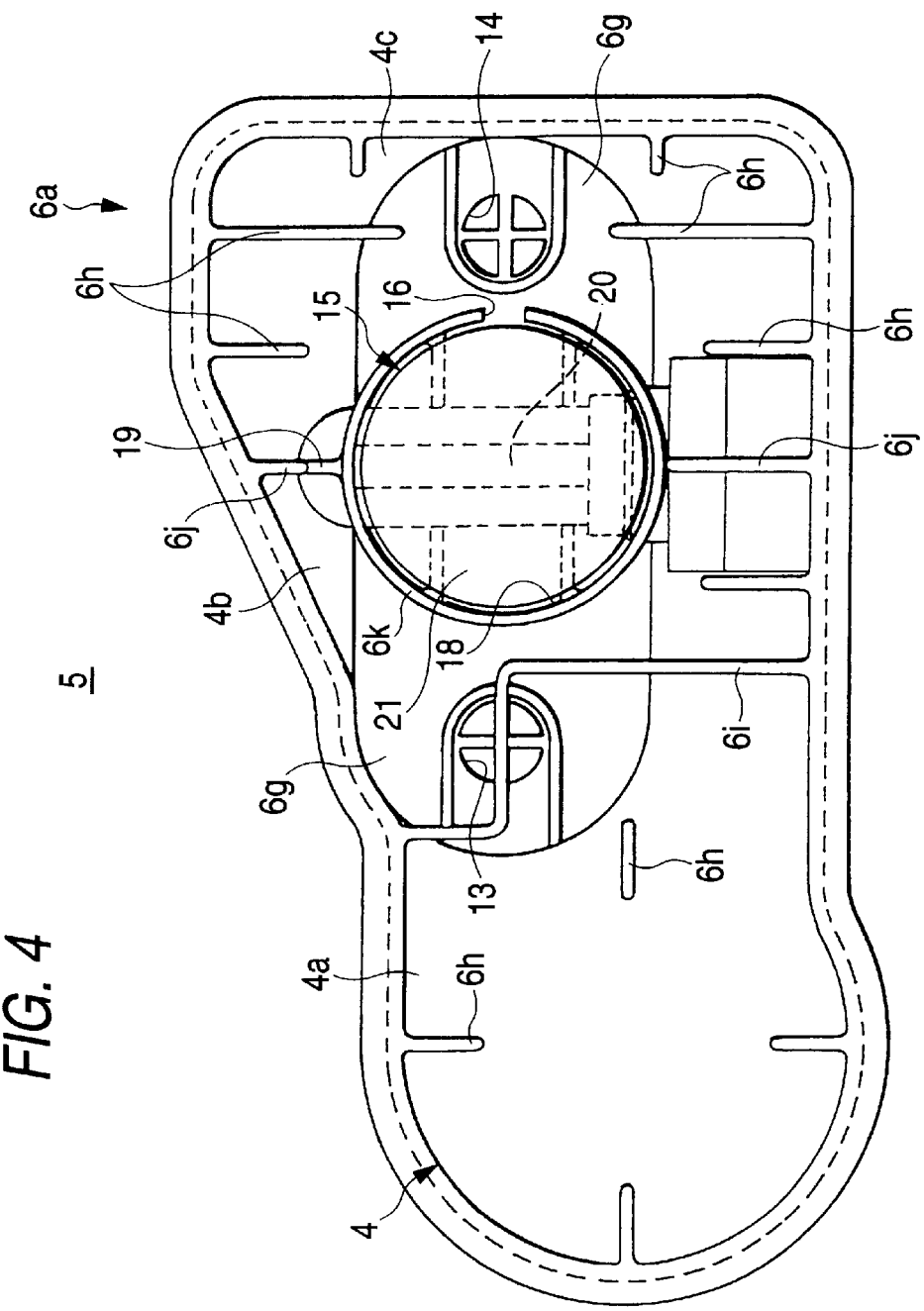
FIG. 4 is a cross-sectional view taken along line IV—IV in FIG. 1 according to the first embodiment of the invention.

The fluid chamber 4 is filled with the working fluid to a level immediately below the reservoir cap 11, that is attached to the fluid injection port 10. In this state, the float 21 in the float chamber 18 is disposed in its upper limit position, where it contacts the ceiling of the upper half portion 6b (see FIG. 1), and the contact points of the lead switch 20 are open. When the level of the working fluid in the third fluid chamber 4c is reduced, the float 21 descends along with the level. When the level of the working fluid in the third fluid chamber 4c is lowered to a predetermined lowest level, the magnet 22 in the float 21 approaches the lead switch 20 and closes its contact points, and an alarm unit or an alarm signal light provided in the vicinity of an driver's seat, is turned on to generate an alarm (FIG. 2).

In this embodiment, the working fluid with which the fluid chamber 4 of the reservoir 5 is filled is satisfactorily supplied to the first to third fluid chambers 4a to 4c via the openings 17 and 19 formed in the upper portions of the partition walls 6i and 6j, and the first union hole 13, which communicates with the first and the second fluid chambers 4a and 4b. When the level of the working fluid is reduced until it is lower than the openings 17 and 19, a predetermined amount of fluid is secured to the first to third fluid chambers 4a to 4c by the partition walls 6i and 6j.

Since the fluid chambers 4a to 4c are small chambers defined by dividing the long fluid chamber 4, which is extended in the longitudinal direction of the vehicle, even when the working fluid is below the level of the openings 17 and 19, and the working fluid is shifted to one side or the surface thereof waves as the vehicle body is displaced in various directions, the partition walls 6i and 6j ensure that an adequate amount of working fluid is maintained in the fluid chambers 4a to 4c. Furthermore, fluctuations in the working fluid level are minimized, so that the erroneous operation of the level detector 15 can be prevented as possible and there is less probability that the first and the second union holes 13 and 14 will be exposed on the fluid level.

In addition, since the first union hole 13 communicates with both the first and the second fluid chambers 4a and 4b, the working fluid in the first fluid chamber 4a, which conventionally is not used, can be effectively employed together with the working fluid in the second fluid chamber 4b. As a result, a satisfactory amount of working fluid can be secured and sufficiently supplied to the cylinder holes of the hydraulic master cylinder 2.

In this embodiment, since the special float chamber 18 that accommodates the float 21 is provided in the cylinder 6k, fluctuations in the working fluid can more effectively be reduced, while a sufficient amount of working fluid is supplied to the float chamber 18. Thus, the erroneous operation of the level detector 15 can more effectively be prevented.

Figure 5:
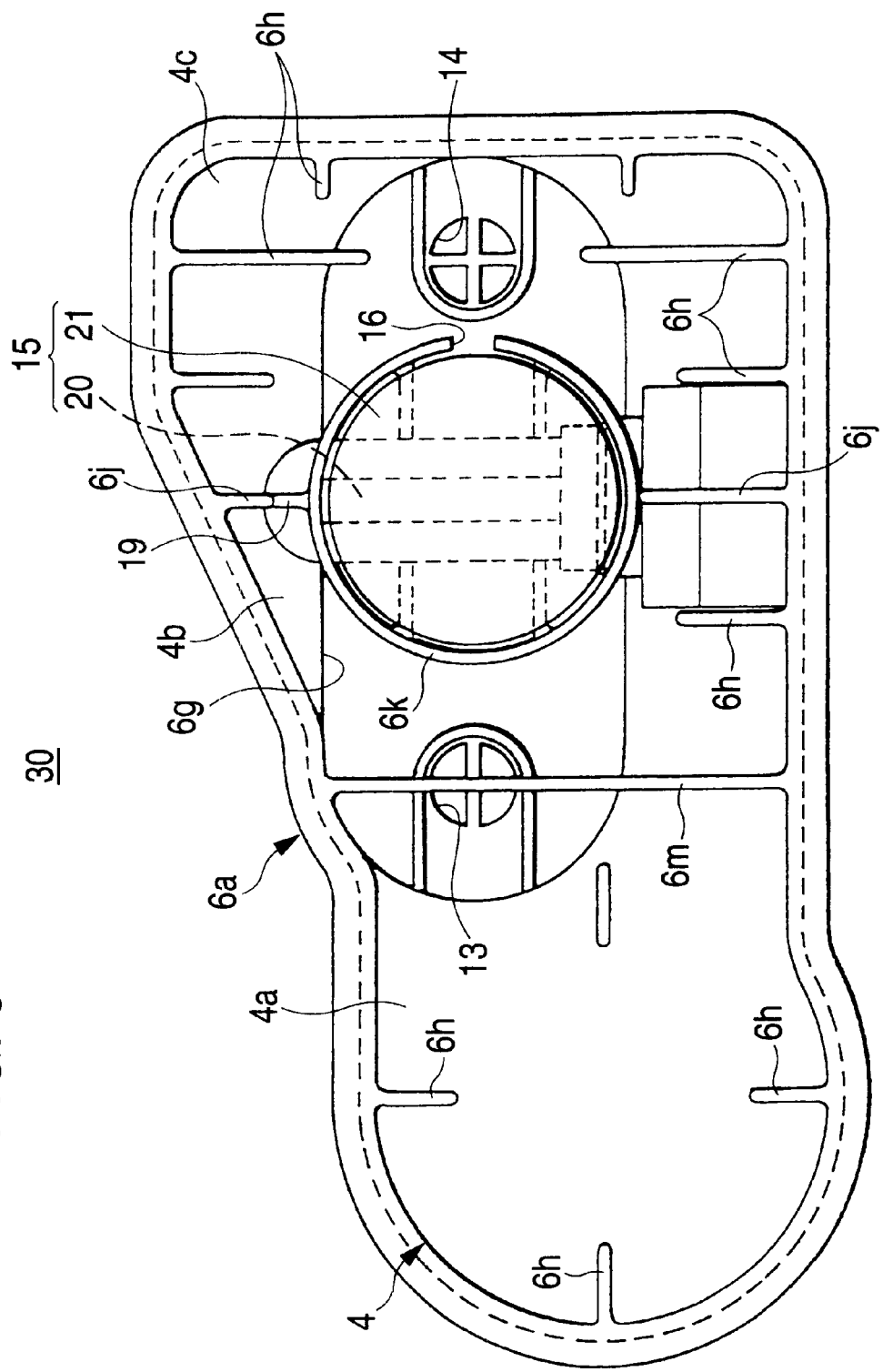
FIG. 5 is a plan view of the lower half portion of a reservoir according to a second embodiment of the invention.

In a reservoir 30 in FIG. 5 according to a second embodiment, a partition wall 6m at the front side of the vehicle, which divides into a first fluid chamber 4a and a second fluid chamber 4b, is linearly formed along the center axis of a first union hole 13 in a width direction of the vehicle. The remaining structure is substantially the same as that for the first embodiment.

In the first and the second embodiments, the second union hole and the level detector are provided in the third fluid chamber. However, the level detector may be provided in the second fluid chamber, or as well as the first union hole for the first and the second embodiments, may be formed to extend over the second and third fluid chambers. Furthermore, in order to more satisfactorily supply the working fluid to the float chamber and prevent erroneous operations, it is effective to accommodate the float of the level detector in the float chamber of a cylinder, in which the partition wall is partially modified, as described in the embodiment. However, erroneous operations can also be prevented without the special float chamber.

As described the above, in the reservoir for the hydraulic master cylinder of a vehicle according to the present invention, even when the working fluid is shifted to one side or the surface thereof waves due to the displacement of the vehicle body in various directions, the working fluid can be supplied to the first to the third fluid chambers, and fluctuations in the working fluid can be minimized. Thus, erroneous operations of the level detector can be prevented to the utmost, and the first and second union holes are seldom exposed on the fluid level. Further, since the first union hole communicates with the first and the second fluid chambers, the working fluid in the first fluid chamber, which conventionally is not used, can be effectively employed together with the working fluid in the second fluid chamber, and a satisfactory amount of working fluid can be obtained and supplied to the cylinder hole of the hydraulic master cylinder.

What is claimed is:

1. A reservoir for a tandem-type hydraulic master cylinder of a vehicle comprising:
   a fluid injection port disposed on an upper portion at a front side of said reservoir;
   a bottom wall defining a first union hole and a second union hole respectively adapted to communicate with cylinder holes formed in said tandem-type hydraulic master cylinder;
   a level detector arrange in a fluid chamber inside said reservoir, said level detector having a lead switch and a float; and
   first and second partition walls respectively at least partially extending along a widthwise direction of said reservoir and extending from said bottom wall within said fluid chamber so as to divide said fluid chamber in a first fluid chamber, a second fluid chamber and a third fluid chamber in this order from the front side of said reservoir,
   wherein said fluid injection port communicates with said first fluid chamber, and said first partition wall at the front side of said reservoir that divides into said first and said second fluid chambers is positioned proximate the upper surface of said first union hole so that said first union hole is communicated with said first fluid chamber and said second fluid chamber,
   wherein said second union hole is arranged in said third fluid chamber and said level detector is arranged in one of said second fluid chamber, said third fluid chamber and an area extending over said second and said third fluid chambers; and
   wherein an opening is formed in an upper portion of said second partition wall at the rear side of said reservoir that divides into said second and said third fluid chambers, so that said second and said third fluid chambers communicate with each other.

2. The reservoir according to claim 1, further comprising:
   a float chamber with a slit for allowing fluid communication between the float chamber and at least one of second and third chambers, said float chamber being formed in one of said second fluid chamber, said third fluid chamber and an area extending over said second and said third fluid chambers.

3. The reservoir according to claim 1, wherein said first partition wall has another opening communicating with said first fluid chamber and said second fluid chamber.

4. The reservoir according to claim 1, further comprising:
   an upper half portion defining respective upper surfaces of said first, second and third fluid chambers;
   a lower half portion defining respective lower surfaces of said first, second and third fluid chambers, said lower half portion being connected with said upper half portion at flush opposed surfaces of said upper and lower half portions.

5. The reservoir according to claim 1, further comprising a substantially C-shaped wall which is partly formed with said second partition wall, said substantially C-shaped wall forming a float chamber.

6. The reservoir according to claim 5, further comprising a slit in said substantially C-shaped wall.

7. The reservoir according to claim 6, wherein said slit is formed on said third fluid chamber side.

8. The reservoir according to claim 5, wherein said float chamber constitutes a part of the third fluid chamber.

9. The reservoir according to claim 5, wherein said opening formed in the upper portion of said second partition wall is a continuous opening.

10. The reservoir according to claim 9, wherein said continuous opening is formed in an upper portion of said substantially C-shaped wall and in one side of said second partition wall toward said substantially C-shaped wall.

11. The reservoir according to claim 1, wherein said first partition wall is bent to have a crank shape and is extended in a longitudinal direction along a center axis of said first union hole such that said first union hole opens into both said first fluid chamber and said second fluid chamber.

12. A reservoir for a hydraulic master cylinder of a vehicle, comprising:
   a fluid injection port disposed on an upper portion at a front side of said reservoir;
   a bottom wall defining at least one union hole adapted to be communicated with a cylinder hole formed in said hydraulic master cylinder;
   a level detector arrange in a fluid chamber inside said reservoir, said level detector having a lead switch and a float; and
   a partition wall at least partially extending along the widthwise direction of said reservoir within said fluid chamber and extending from said bottom wall so as to divide said fluid chamber into a first fluid chamber and a second fluid chamber in this order from the front side of said reservoir, wherein said fluid injection port communicates with said first fluid chamber, and said partition wall is positioned proximate the upper surface of said union hole so that said union hole is communicated with said first fluid chamber and said second fluid chamber.

13. The reservoir according to claim 12, further comprising:
a float chamber with a slit for allowing fluid communication between the float chamber and the second chamber, said float chamber being formed in said second fluid chamber.

14. A reservoir for a tandem-type hydraulic master cylinder of a vehicle, comprising:
a fluid injection port disposed on an upper portion at a front side of said reservoir;
a bottom wall defining first union hole and a second union hole respectively adapted to communicate with cylinder holes formed in said tandem-type hydraulic master cylinder;
first and second partition walls respectively at least partially extending along a widthwise direction of said reservoir within a fluid chamber and extending from said bottom wall so as to divide said fluid chamber into a first fluid chamber, a second fluid chamber and a third fluid chamber in this order from said front side of said reservoir,
a substantially C-shaped wall which is partly formed with said second partition wall, said substantially C-shaped wall forming a float chamber; and
a level detector arranged in a float chamber, said level detector having a lead switch and a float, and
wherein said fluid injection port communicates with said first fluid chamber, and said first partition wall at said front side of said reservoir that divides into said first and said second fluid chambers is positioned proximate an upper surface of said first union hole so that said first union hole is communicated with said first fluid chamber and said second fluid chamber, wherein said second union hole is arranged in said third fluid chamber and said level detector is arranged in one of said second fluid chamber, said third fluid chamber and an area extending over said second and said third fluid chambers.

15. The reservoir according to claim 14, wherein an opening is formed in an upper portion of said second partition wall at a rear side of said reservoir that divides into said second and said third fluid chambers, so that said second and said third fluid chambers communicate with each other.

16. The reservoir according to claim 15, wherein:
said float chamber constitutes a part of said third fluid chamber; and
said opening formed in said upper portion of said second partition wall is a continuous opening formed in an upper portion of said substantially C-shaped wall and in one side of said second partition wall toward said substantially C-shaped wall.

17. The reservoir according to claim 14, further comprising a slit in said substantially C-shaped wall formed on said third fluid chamber side.

18. The reservoir according to claim 14, wherein said first partition wall is bent to have a crank shape and is extended in longitudinal direction along a center axis of said first union hole such that said first union hole opens into both said first fluid chamber and said second fluid chamber.

* * * * *